Figure 1:
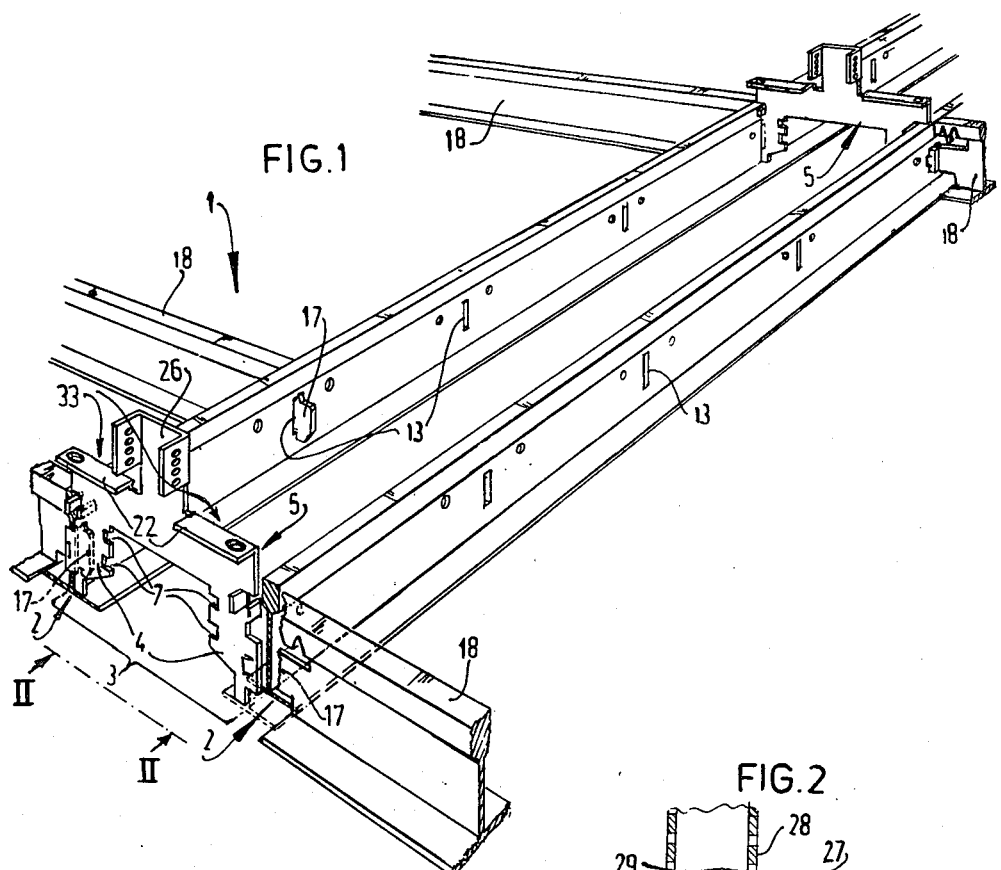

United States Patent [19]

Smits et al.

[11] Patent Number: 4,481,745

[45] Date of Patent: Nov. 13, 1984

[54] CEILING AND COUPLING ELEMENT FOR THE SAME

[75] Inventors: Johan G. Smits, Baarn; Johan A. de Weerd; Cor K. Vuyk, both of Blaricum, all of Netherlands

[73] Assignee: Nemaco Trading Limited, St. Helier, Channel Islands

[21] Appl. No.: 572,620

[22] Filed: Jan. 24, 1984

Related U.S. Application Data

[63] Continuation of Ser. No. 247,630, Mar. 25, 1981.

[30] Foreign Application Priority Data

Apr. 3, 1981 [NL] Netherlands .......................... 8002018

[51] Int. Cl.³ .............................................. E04B 5/48
[52] U.S. Cl. .................................................. 52/220
[58] Field of Search ..................... 52/28, 39, 220, 221, 52/434, 669; 174/48, 49; 248/342, 343

[56] References Cited

U.S. PATENT DOCUMENTS

| 2,854,205 | 9/1958 | Kruger | 248/343 |
| 2,939,669 | 6/1960 | Pascucci | 248/343 |
| 3,085,152 | 4/1963 | Schwartz et al. | 52/484 |
| 3,512,313 | 5/1970 | Harz | 52/28 |
| 3,708,932 | 1/1973 | Bailey et al. | 52/484 |
| 3,710,530 | 1/1973 | Valtonen | 174/48 |
| 4,051,640 | 10/1977 | Vincens | 52/220 |
| 4,086,480 | 4/1978 | Lahm | 248/343 |
| 4,156,795 | 5/1979 | Laean | 174/48 |

Primary Examiner—Peter M. Caun
Attorney, Agent, or Firm—Diller, Ramik & Wight

[57] ABSTRACT

In a ceiling grating of carrier girders two carrier girders are closely arranged next to one another so that a line channel is formed in between them. These two carrier girders are interconnected by means of runner-shaped coupling elements formed as plates having between their limbs a line channel.

7 Claims, 5 Drawing Figures

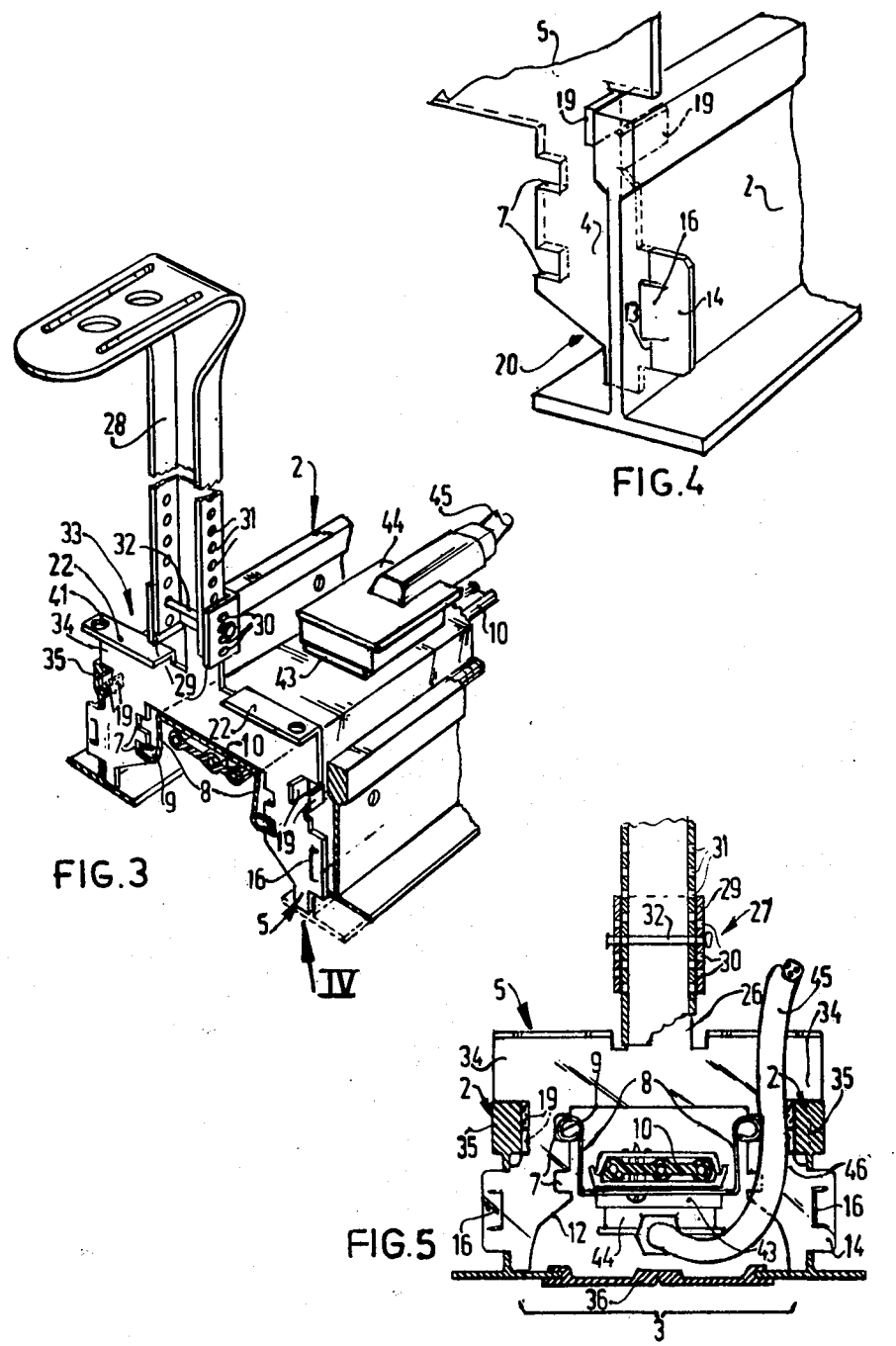

CEILING AND COUPLING ELEMENT FOR THE SAME

This application is a continuation, of application Ser. No. 247,630, filed Mar. 25, 1981.

The invention relates to a ceiling comprising a grating of relatively spaced, parallel carrier girders and a line channel extending parallel to the carrier girders, in which at least one line channel is provided between at least one pair of carrier girders, and the carrier girders of said pair are intercoupled by means of coupling elements accommodating at least one line channel.

Such a ceiling is known from Dutch patent application laid up for public inspection No. 6905984. Herein the coupling element is formed by a length of U-section profile, the flanges of which are each fastened to a carrier girder. The web of said U-section profile is exposed to bending stress, but is not well capable of withstanding said bending stress, so that the carrier girders bounding the line channel are not firmly coupled with one another.

The invention provides a simple ceiling in which the carrier girders may have any profile, particularly a T-section profile and in which the coupling elements firmly couple the carrier girders bounding the line channel with one another, because each coupling element essentially consists of a runner-shaped plate extending transversely of the line channel and accommodating a line channel beteween its limbs and because each limb is provided with a nose passed through a vertical slot of a carrier girder.

It is particularly important that by using commercially available carrier girders a ceiling can be built in which simple coupling elements enable the formation of line channels by firmly coupling two carrier girders positioned at a small distance from one another.

Preferably the limbs of each coupling element have on the inner side a recess for receiving a flange of a gutter for a branch cable, particularly a ribbon cable, said flange engaging by spring action the recess of the limb of the coupling element. It will furthermore serve as a mounting element for the electric wiring system, whereby plugs and other protruding elements remain inside the line channel, where they are withdrawn from sight preferably by a cover strip arranged in the plane of the ceiling. The gutter can be simply provided in the line channel, when at least one limb has an inclined rim on the inner side beneath a recess receiving a flange of the gutter.

Locking the coupling element to the carrier girders can be readily carried out when the nose has at least one hook bent out of its plane.

Coupling noses having hooks bent out of their plane are known per se from French Patent Specification No. 1,521,672.

The carrier girders bounding the line channel are relatively better fixed in an axial direction, when the coupling element is provided with two pairs of supporting tags bearing on carrier girders and protruding pairwise away from the coupling element in opposite axial directions of the carrier girders.

In order to form one or more additional line channels the coupling element is preferably provided with at least one supporting console for ducts bent as far as to the horizontal plane, the supporting console forming the bottom of a line channel and/or a narrow passage is provided between a gutter and a a carrier girder for ducts, said passage giving access to a line space bounded by a limb of the coupling element and extending in an axial direction.

When the coupling element has a head provided with hanger-engaging means, the ceiling can be suspended from the building construction by means of the coupling element.

When a line gutter can be fastened in two relatively inverted positions between the limbs of the coupling element, ducts can be optionally inserted from the upper or the lower side into the gutter. For that matter, a cable may emerge at the top or at the bottom from between the gutter and the carrier girder from a plug provided on the bottom or top side of the gutter.

The invention relates to and provides furthermore a coupling element intended for use in a ceiling according to the invention.

It should be noted that a plate-shaped coupling suspension element is known from German Patent Application laid up for public inspection No. 2363908 for suspending a substantially U-shaped profile, in which two noses engage the two flanges of one and the same U-profile. The plate-shaped coupling element also has the shape of a runner. The channel formed between the limbs is not intended for use as a line channel and not usable as such, because there is no access from the lower side. This channel is shut off by the web of this U-shaped profile. This coupling element does not engage the flanges by means of noses extending through vertical slots, in contrast they grip around bent-over rims of the flanges.

French patent application 2,086,197 describes a U-shaped coupling element which couples two carrier girders bounding a line channel with one another in a ceiling grating, while also other elements are employed for completing the coupling. This known coupling structure is complicated and cannot be easily mounted.

The above mentioned and further features of the invention will be described more fully in the following description with reference to a drawing.

Figure 2:
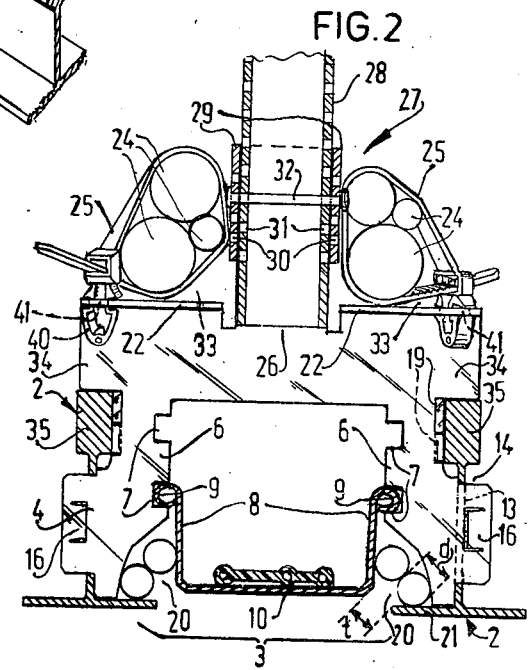

The drawing shows in:

FIG. 1 a perspective plan view of part of an embodiment of a ceiling in accordance with the invention, FIG. 2 an enlarged sectional view taken on the line II—II in FIG. 1, FIG. 3 a perspective view of the detail shown in FIG. 2, FIG. 4 on an enlarged scale detail IV of FIG. 3, and FIG. 5 an elevational view corresponding to FIG. 2 of a further variant.

The ceiling 1 of FIG. 1 comprises a grating of a plurality of relatively spaced, parallel carrier girders 2, only two of which are shown, said two forming a pair providing between them a line channel 3 for technical supply lines for example, electric conductors, low-voltage conductors for communication purposes, air and/or gas ducts. The carrier girders 2 of said pair are intercoupled by means of runner-shaped coupling elements 5 accommodating the line channel 3 between their limbs 4. The limbs 4 of each coupling element 5 have on the inner side 6 recesses 7 for receiving the bead rim of a flange 9 of a gutter 8 in which a ribbon cable 10 is arranged. The flanges 9 are elastically flexible and their bead rims resiliently snap into opposite recesses 7 in the limbs 4. Each inclined rim 12 beneath the recesses 7 constitutes an orientating guide for facilitating mounting of the gutter 8 in the coupling elements 5.

The gutter 8 may be provided with welding boxes and contact boxes optionally accessible from above or below.

Each limb 4 is provided with a nose 14 passed through a slot 13 of a carrier girder 2. Each nose 14 has a hook 16 bent out of its plane and hooking behind the web 15 of the carrier girder 2, said hook being rigidly locked when the nose 14 of a coupling element 5 can be passed through one and the same slot 13 of a carrier girder 2 as well as a nose 17 protruding from the other side of the web 15 of a transverse girder 18.

The coupling element 5 is provided with two pairs of bent-over supporting tags bearing on carrier girders and protruding pairwise from the coupling element 5 in opposite axial directions of the carrier girder 2. These supporting tags 19 prevent relative axial displacements of the carrier girders intercoupled by the coupling elements 5.

FIG. 2 shows an uninterrupted, axial space on each side of the gutter 8, which space is bounded by the locally bevelled limbs 4. This space 20 may accommodate for example, telephone lines 23 having elastic sheaths of a diameter d slightly exceeding the passage t between the ribbon cable 10 and the flange 21 of the carrier girder 2.

Each coupling element 5 is preferably provided with two supporting consoles 22 on the top side of the coupling element, said consoles being bent over into the horizontal plane. All kinds of lines 24 not allowed to bear on a sharp edge may be deposited on said consoles. These consoles 22 each constitute the bottom of a line channel 33, which is furthermore bounded by a head 26 provided with suspension means 27 for a hanger 28 by which the coupling element 5 may be suspended from a ceiling of a building construction. Said head 26 has two bent-over flanges 29 having fastening holes 30, which together with a series of fastening holes 31 of the hanger 28 constitute a vernier, so that the coupling element 5 can be readily suspended at any height from the hanger 28 by means of a pin 32 passed through registering holes 30 and 31. The holes 30 are located at a slightly smaller pitch distance from one another than the holes 31. The line channel 33 is furthermore bounded by known slings 25 bundling the lines 24 and extending each with an elastic, hooking foot 40 through a hole 41 of a supporting console 22. By projecting arms 34 the coupling element 5 bears on the heads 35 of carrier girders 2, which may be made from sprayed aluminium or from curved sheet material.

The coupling elements 5 according to the invention ensure a strong connection between the carrier girders 2 and provide, in addition, the space required for all kinds of technical lines between the intercoupled T-section carrier girders 2 spaced apart by the size of a line channel. The carrier girders 2 and the transverse girders 18 are capable of carrying ceiling slabs (not shown).

Since the pair of carrier girders 2 are firmly fixed in their relative positions, the pair is eminently suitable for use as a carrier for apparatus such as air inlet and outlet casings, loud speakers, tighting fittings and as supports for separating partitions and technical columns.

Whereas the coupling elements 5 shown in FIGS. 1 to 4 each accommodate three line channels, a line chanel 3 and two line channels 33, the coupling element 5 of FIG. 5 does not possess the line channels 33. The line channel 3 or the space between two carrier girders 2 can be screened by a strip 36 of elastic material.

Referring to FIG. 3 the gutter 8 is mounted in an inverted position. FIGS. 3 and 5 show the ribbon cable 10 with a contact box 43 and a plug 44 arranged in the gutter 8, the cable 45 passing the free space 46 between the gutter 8 and the carrier girder 2 downwards and upwards respectively in a vertical sense across the gutter 8.

The coupling element as described above serves both as the intercoupling to carrier girders 2 and as the suspension of the ceiling to an above lying construction e.g. building structure, ceiling. Moreover, the coupling element serves as a fastening element, which fastens the gutter 8 to the carrier girders.

What we claim is:

1. In a suspended ceiling structure,
a grid system comprising a plurality of spaced, parallel girders each having an upstanding web and a horizontal flange joined with the bottom of the web, said webs being provided with a series of narrow, vertically elongate slots,
a plurality of spaced coupling members joining a pair of said girders, each coupling member having a main body portion of generally plate-like form disposed in a vertical plane perpendicular to said webs, said main body portion having a downwardly facing recess defining an upper portion of the main body which bridges between and overhangs said pair of girders, and a pair of depending limbs, each of said limbs having an outwardly projecting tab received in one of said slots of a respective one of said pair of girders and substantially filling the area thereof to stabilize against relative twisting motion between said coupling members and said webs, first means comprising a resilient hook struck out of each of said tabs for respectively passing through said slots and bearing against the outer sides of the webs of said pair of girders to force the webs of such girders inwardly into predetermined spaced relation, and second means on said main body portion of each coupling member for bearing against the inner sides of the webs both above and below said first means and laterally of said hooks to maintain the webs of said pair of girders at said predetermined spacing and to maintain said limbs in stabilized, perpendicular relation to said webs.

2. In a suspended ceiling structure as defined in claim 1 wherein said second means includes ears bent from said limbs and extending perpendicular to the plane of said main body portion and engaging said inner sides of the webs.

3. In a suspended ceiling structure as defined in claim 2 wherein each limb is provided with a pair of said ears, the ears of each pair projecting on opposite sides of said plane.

4. In a suspended ceiling structure,
a grid system comprising a plurality of spaced, parallel girders each having an upstanding web and a horizontal flange joined with the bottom of the web, said webs being provided with a series of vertically elongate slots,
a plurality of spaced coupling members joining an adjacent pair of said girders, each coupling member having a main body portion of generally plate-like form disposed in a vertical plane, said main body portion having a downwardly facing recess defining an upper portion of the main body which bridges between and has ends overhanging said pair of girders, and a pair of depending limbs, each of said limbs having an outwardly projecting tab received in one of said slots of a respective one of said pair of girders, first means comprising a resilient hook struck out of each of said tabs of respectively passing through said slots and bearing against the outer sides of the webs of said pair of girders to force the webs of such girders inwardly into predetermined spaced relation, and second means on said main body portion of each coupling member for bearing against the inner sides of the webs immediately below the overhanging ends of said upper body portion to maintain the webs of said pair of girders at said predetermined spacing and to prevent relative axial displacements of said pair of girders.

5. In a suspended ceiling structure as defined in claim 4 wherein said second means includes at least one ear bent from said second means includes at least one ear bent from each limb and engaging the inner side of a web.

6. In a suspended ceiling structure as defined in claim 4 wherein said second means comprises a pair of ears bent in opposite directions from each limb and engaging the inner side of a web.

7. In a suspended ceiling structure as defined in any one of claims 4-6 including transverse girders aligned with the opposite ends of at least one of said coupling members, each transverse girder having a protruding nose received in one of said slots within which a projecting tab of said one coupling member projects, said transverse girders being disposed on the opposite sides of said pair of girders with respect to said one coupling member and being adapted to bridge between the girders of said pair and a further pair of girders paralell to the pair first mentioned.

* * * * *